Sept. 20, 1960   P. MAKER   2,952,949
GRINDING MACHINE
Filed April 16, 1956   3 Sheets-Sheet 1

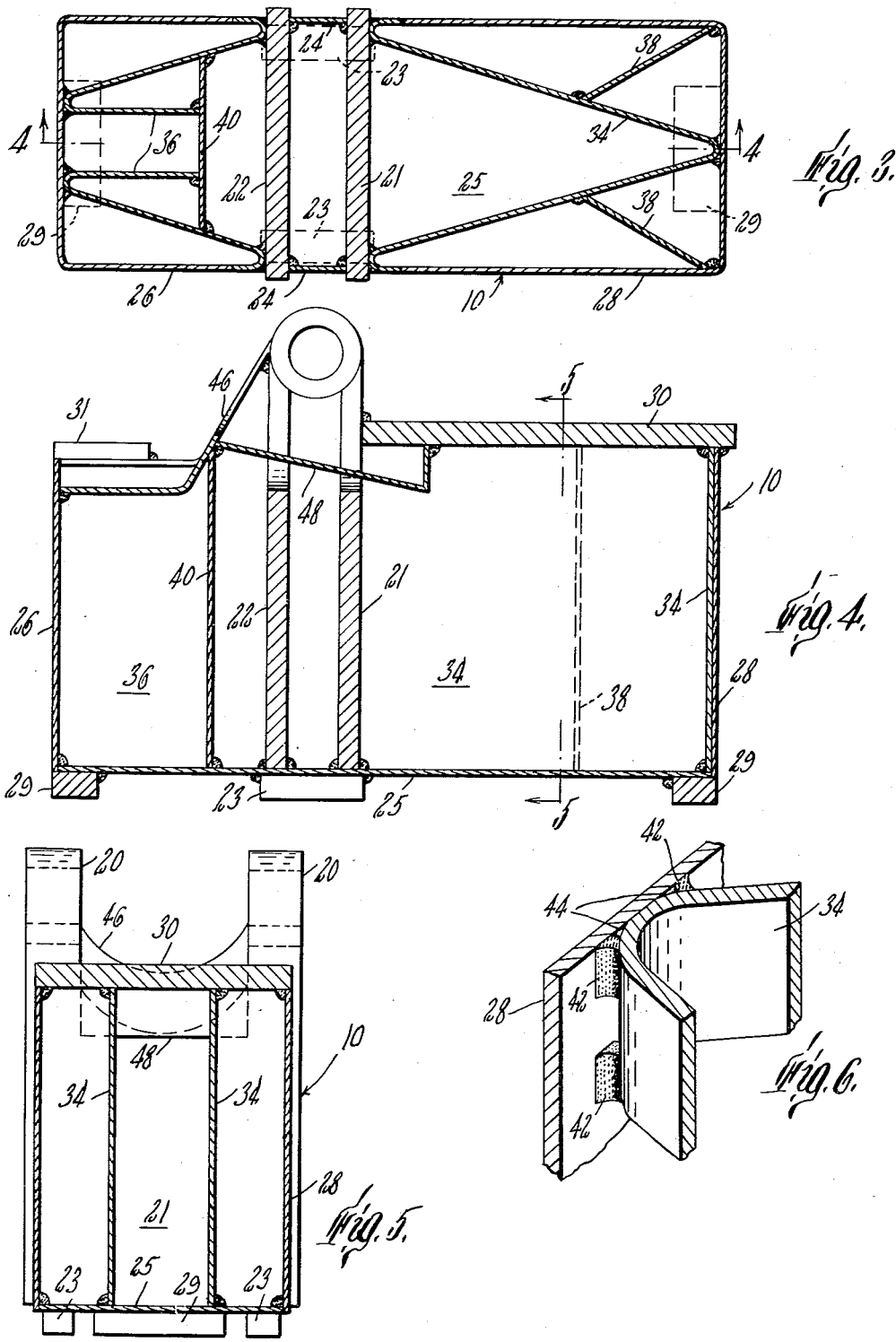

Sept. 20, 1960     P. MAKER     2,952,949
GRINDING MACHINE
Filed April 16, 1956     3 Sheets-Sheet 3
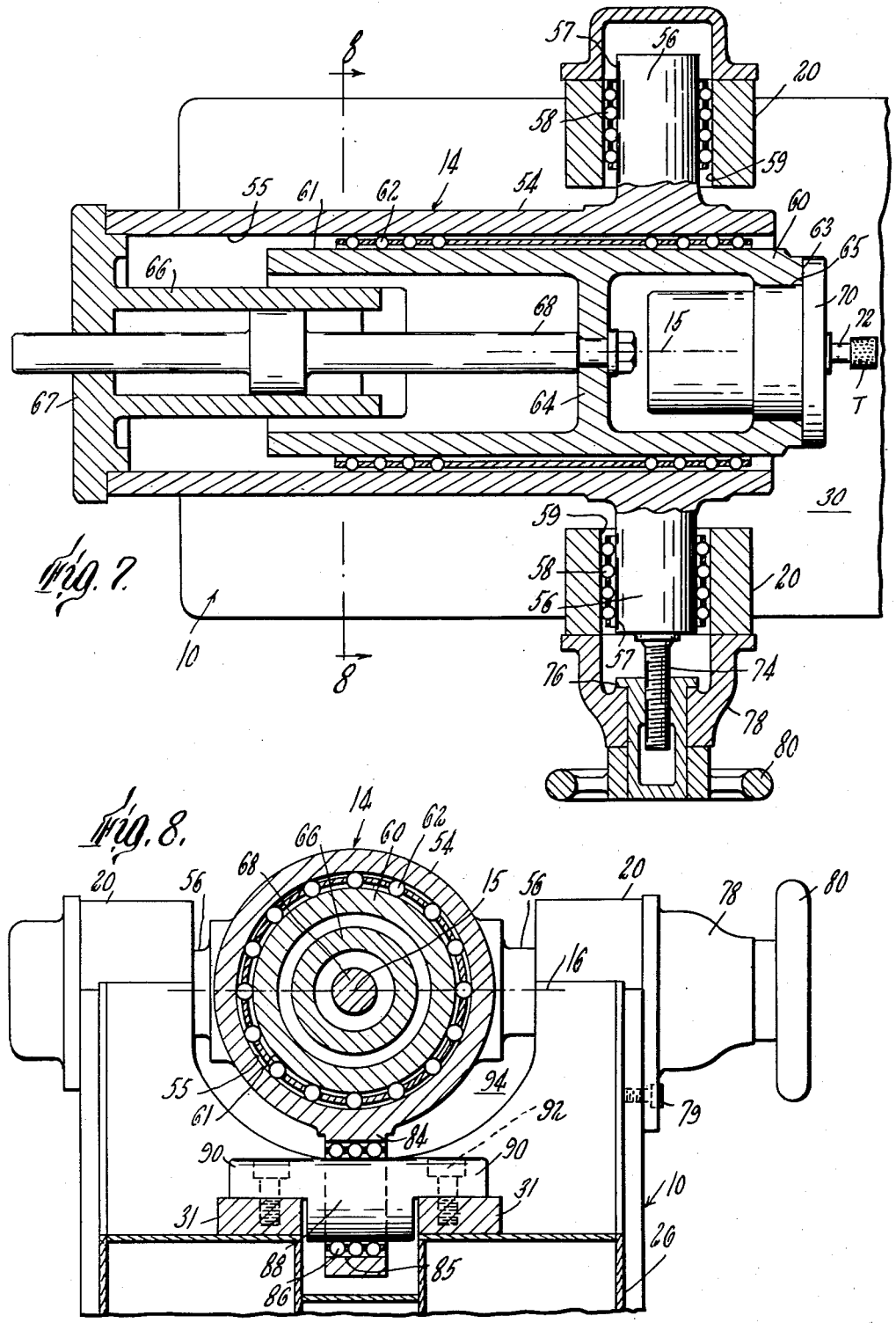

United States Patent Office 2,952,949
Patented Sept. 20, 1960

2,952,949
GRINDING MACHINE

Paul Maker, Springfield, Vt., assignor to Bryant Chucking Grinder Company, Springfield, Vt., a corporation of Vermont Filed Apr. 16, 1956, Ser. No. 578,361

20 Claims. (Cl. 51—50)

This invention relates to grinding machines and, more particularly, to a novel internal grinding machine having a novel prestressed welded supporting base structure as well as a novel tool and workpiece supporting structure wherein the supporting of the machine elements is carried out in a novel manner and a rigid light weight structure having desirable vibration damping characteristic is provided.

The early concept that a mchine base and its tool and workpiece supporting structure was merely a pedestal and housing for the operative elements and their auxiliaries is no longer considered to be the case. On the contrary, recent technology demands that the entire machine be constructed as an element having actual mechanical functions. Thus, the overall construction must meet requirements as to maintenance of alignment and reduction of vibration, which are to a certain extent inconsistent with one another. For example, early attempts to meet such requirements were made by "beefing up" the structure to add mass to the design, but this approach has proved to a large degree erroneous because any gain in rigidity has generally been more than offset by introducing undesired vibration characteristics.

Structures fabricated by welding, for example, rather than by casting, have recently been shown to have many desirable design features. For instance, rigidity can be obtained by eliminating all openings in the walls and without the necessity of introducing undesirable dead weight as is the case with castings. Also, there is considerable freedom in placing internal walls and supporting members. However, present welding designs have posed problems particularly in regard to effectiveness of vibration damping.

It is an object of the present invention to provide a novel internal grinding machine having novel workpiece and tool supporting arrangements and wherein the base structure is welded from formed steel sheets or plates, to provide a prestressed structure which combines light weight with rigidity, has favorable vibration damping characteristics, and at the same time lends itself to economical manufacture.

Another object of the invention is to provide a machine structure having a natural frequency of vibration at a value high enough to eliminate the chance of operating the vibratory system through a critical resonance level.

Still another object of the invention is to provide a machine structure wherein a short and simple closed force loop system is provided when the operative elements of the machine are in contacting and operative relationship.

Further objects and advantages will appear in the following description of a preferred embodiment of the invention, together with the accompanying drawings in which:

Fig. 3 is a sectional plan view along the line 3—3 of Fig. 2 illustrating the prestressed welded base structure of the machine of Figs. 1 and 2;

Fig. 4 is a sectional side elevation taken along the line 4—4 of Fig. 3;

Fig. 5 is a sectional end elevation taken along the line 5—5 of Fig. 4;

Fig. 6 is an enlarged view of a portion of Figs. 3–5 showing a welded vibration damping joint thereof;

Figure 1:
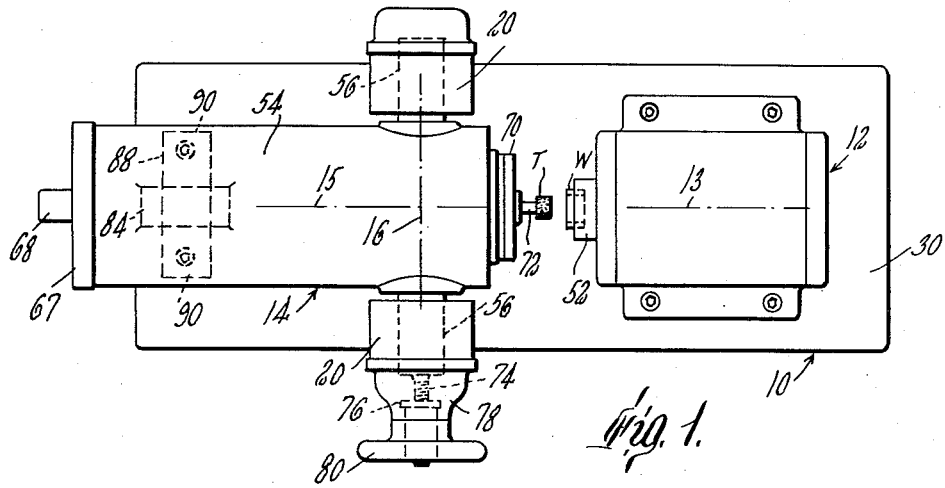
Fig. 1 is a plan view of the internal grinding machine of the invention.
Figure 2:
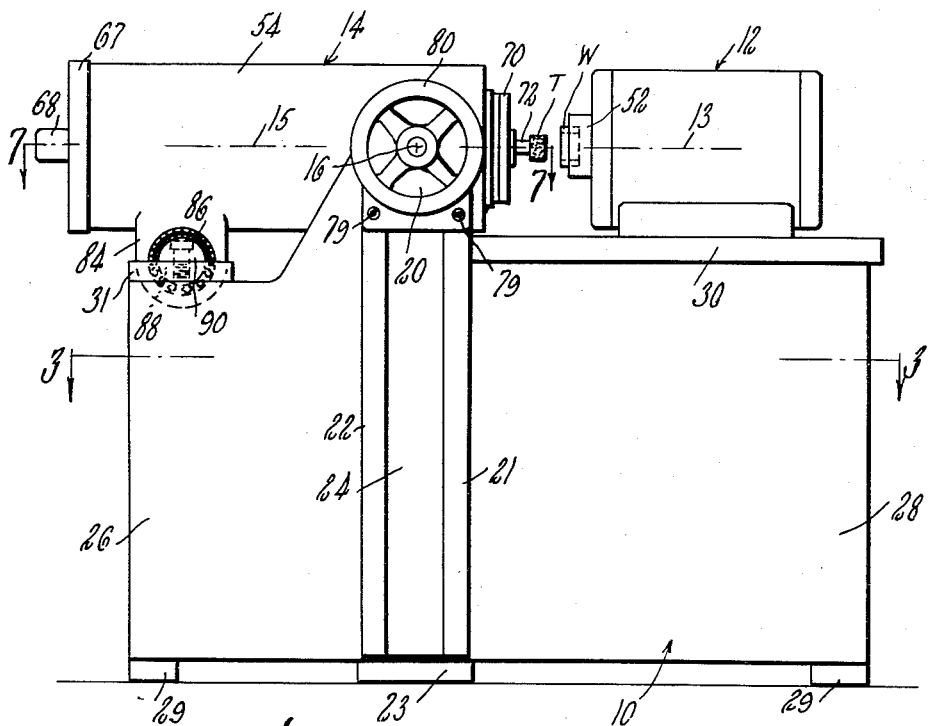
Fig. 2 is a side elevation of the machine of Fig. 1.

Fig. 7 is a sectional plan view along the line 7—7 of Fig. 2 illustrating the workpiece and tool supporting arrangements of the machine of Figs. 1 and 2; and Fig. 8 is a sectional front elevation along the line 8—8 of Fig. 7.

The freedom from vibration and the accurate maintenance of alignment to a large extent determine the quality of work produced on metal cutting tools in general, and on precision grinding machines in particular. Most exacting in these respects is the internal grinding machine, wherein there is a combination of high and low speed rotative movements; and fast and slow speed rectilinear and reciprocative movements involving large masses. At the same time, the machine is required to produce, at high rates of production, a product in which the tolerance limits often are measured in micro inches. Because of the problems of meeting such exacting demands, extensive tests have been conducted on a high production internal grinding machine constructed according to the present invention to have specifications for alignment and freedom from vibration far in excess of present machines. Such tests have indicated clearly that the results obtained are consistent with the predicted performance by not only meeting the set specifications in regard to rigidity and vibration damping characteristics, but in certain respects exceeding them.

The following description of a preferred embodiment of the invention is directed to such a high production, high precision internal grinding machine including its base structure. Consideration has been given in this machine to closing and simplifying the loops of a stable force system, attenuating the transmitted vibration by means of efficient damping structures, and minimizing the effects of thermal disturbances.

Referring to Figs. 1 and 2, at 10 is indicated the base structure on which is mounted the workhead 12 including its workpiece driving spindle and the toolhead 14 including its grinding tool holding spindle. During operation, with the grinding tool T in grinding contact with a workpiece W, the toolhead, and the workhead together with the base form a closed loop force system. In the preferred embodiment, the workhead 12 can be considered a fixed part of the base 10 since it is rigidly attached thereto, and carries only the comparatively slowly rotatable workpiece driving spindle which rotates about its axis 13.

According to this invention, the toolhead 14 carries the tool T for rotation about its spindle axis 15 and is supported for pivotal movement about and for transverse movement along an axis 16 coplanar with and at right angles to the tool spindle axis 15, said tool spindle axis being located in a plane parallel to a plane containing the workpiece spindle axis 13. Said toolhead is further supported at its outboard end remote from axis 16 at the opposite end of the base 10 from the workhead (the left end in the drawings herein) directly on the base 10. The toolhead 14 contains the high speed rotatable tool spindle, which together with its driving means are mounted coaxially inside a slide to which can be imparted a reciprocatory movement in the direction of the spindle axis 15. Furthermore, the toolhead 14 is arranged for a feed movement in a direction transverse to the tool and work spindle axes 15 and 13 respectively along axis 16 and the force inducing said movement is applied in the direction of axis 16, which axis is coplanar with the tool spindle axis 15, and is preferably located to pass through or in close proximity of the center of gravity of the toolhead system in such a way that the force components of normally present external forces are considered as an element of the location of said center of gravity. By such arrangement, not only is the closed loop of the stable force system shortened, but it is also substantially simplified. Moreover, in comparison with conventional machine bases, the deflections occurring in the planes of the principal axes are reduced to one-eighth due to shortening of the effective length of the machine base by one half, and the natural frequency of vibration is hence advantageously increased due to such shortening.

Additionally, in each closed loop of the stable force system, there are damping structures which effectively attenuate vibrations transmitted through them. Also, certain gaps are provided between the base 10 and the high temperature producing elements of the machine for minimizing thermal transmission and hence distortion. Further minimization of the effects of thermal distortion is achieved by providing certain direct thermal transmission paths to the major masses of the base structure. Thus a thermally stable structure is provided.

In Figs. 3 to 6 is shown the structure of the box section base 10 in detail. The center portion of the base at the machine element supporting upperside of the base forms the reinforced support for the toolhead supporting bearings 20 on a pair of vertical transversely extending spaced plates 21 and 22 of high mass forming a transverse bulkhead member. Such central portion comprises the plates 21 and 22, side plates 24 extending longitudinally therebetween at their ends and the bottom 25 welded together as a closed box section for high torsional rigidity and also for establishing a node of vibration at the center portion. For this reason the plates 21 and 22 are made of relatively heavy plate metal. The sides and ends of the base are made from lighter sheet metal members preferably bent twice at right angles, to form U-shaped pieces of appropriate size to form the toolhead end piece 26 and the workhead end piece 28. The top workhead supporting portion of the base (to the right in Figs. 1, 2 and 4) is made from a heavy steel plate 30 in order to gain rigidity against deformative forces that possibly might occur when attaching the workhead 12 and auxiliary elements. Pads 31 are provided at the other end of the machine for supporting the outboard end of the toolhead. Excluding a few base supporting pads such as central pads 23 beneath the transverse bulkhead plates 21 and 22 and end pads 29 beneath the end corners, all other parts of the base are made of comparatively thin sheets. The entire base has no opening.

In an internal grinding machine structure, vertical rigidity is more important than rigidity in other planes, due to the fact that misalignment in the vertical plane has the greatest effect on the accuracy of the workpiece. Thus, internal bracing members or walls 34 and 36 are arranged vertically at the workhead and toolhead ends of the machine respectively, and in order at the same time to gain horizontal rigidity and to provide vibration damping, said walls are of a generally V-shaped configuration starting at the outer edges of the transverse bulkhead and slanting inwardly toward the ends of the base wall 25 having a central curved V bend and outward curved V bends at its ends so that said ends will butt with the ends of end piece 28 adjacent transverse plate 21; and walls 36 each having a generally central curved V bend with the outward leg thereof having an outward curved V bend at its end adjacent transverse plate 22 to butt with the ends of end piece 26 and with its inward leg terminating short of said outward leg. In addition, diagonal walls or strut plates 38 run from the outer skin at the corners of end piece 28 to each of the legs of wall 34 and a cross wall 40 is provided between the outer legs of walls 36 across the ends of their inner legs. The walls 38 and 40 act to prestress the box-like base structure for better damping and also serve to eliminate local "drum effects," since shrinkage forces provided by their welding are resisted by the base sheet metal end pieces 26 and 28 extending between the ends of said internal bracing members.

In welding the internal walls 34 and 36 to the supporting plates 21 and 22 and to the end walls of end pieces 26 and 28, a welding technique is followed to provide a damping joint. Thus as shown in Fig. 6, for example, the curved end of internal wall 34 positioned in firm pressure contact with the inner end surface of end piece 28 is welded to provide areas of weld metal 42 extending between said elements but spaced outwardly from the area of contact to provide voids 44 on each side of said area of contact. By such a structure, vibration damping is provided in such joints by friction along the area of contact of two members. To secure the greatest effect, the contact area at the bend of curved member 34 is slightly widened to form a flat as by filing or the like. During welding, said flat is held tightly against the mating member by means of clamps or the like, and the welding fillets 42 are applied without entering the area of contact. In cooling, the area of weld metal contracts and thereby pulls the parts together into intimate contact as well as acting to prestress the structure. Said fillets can be continuous or intermittent along the area of contact as required by structural or manufacturing considerations.

The sequence of welding operations in the construction of the base in general and in the preferred embodiment in particular, is of importance in meeting the requirements and aims set forth in the present invention. Accordingly, the center transverse bulkhead section is assembled first by welding supporting plates 21 and 22 and side walls 24 together using continuous welds to form a box section.

Next, the internal bracing member system beneath the outboard end of the toolhead 14, comprising the formed sheet metal plates 36 and cross member 40, is welded together. This internal wall system is then welded to the transverse bulkhead plate 22 to provide damping joints described above in connection with Fig. 6. The next step is to butt weld the outside wall or skin 26 to the free edges of inner wall plates 36 using a continuous weld. The V bends of said walls 36 butt against the inner end surface of outside wall 26 and are joined thereto by suitable welds to form a damping joint within a closed box structure.

The internal wall system beneath the workhead 12 is built up in much the same way. Internal bracing wall 34 is attached to transverse bulkhead plate 21 to provide damping joints, and strut plates 38 are joined to wall 34. The ends of outer wall 28 are then butted to the ends of wall 34 and are joined to the free edges of this latter wall with a continuous butt weld. The strut plates 38 are then attached to wall 48. Finally there is formed a damping joint between internal bracing wall 34 and end plate 28.

The toolhead supporting bearings 20 are then welded to the base structure and top plate 30 is welded all around. The formed cover sheets 46 and 48 are welded in place as is bottom sheet 25, plug welds being used for attaching the inner walls to said bottom sheet by drilling holes in an outer member in register with the edges of an inner member and producing a joint between said member by back welding through said holes. Base pads 23 and 29 are joined to the base and toolhead supporting pads 31 are welded in the positions indicated. It is to be observed that damping joints thus have been provided at the junction of supporting plates 21 and 22 with internal walls 34 and 36 respectively, this being of prime importance. Such joints also have been provided at the end wall surfaces although in the described preferred embodiment they are of a lesser degree of importance, serving in more local a function.

The arrangement of the operative elements including the work engaging members of the internal grinding machine of the invention is shown in Figs. 1, 2, 7 and 8. Part of the base is indicated by 10 and to the right the top portion 30 is shown, to which is attached by suitable bolts, the workhead 12 adjacent one end of base 10. The workhead has journaled therein a rotatable workpiece driving spindle carrying at its left and free end a conventional work driving device or chuck indicated at 52 in Figs. 1 and 2 holding by its outer periphery an annular workpiece W to be ground. Other workpiece driving and supporting means than a chuck may be used, however, and the invention is as well applicable to machines working on the centerless principle for generating circular or non-circular surfaces of revolution, wherein the work spindle axially supports the workpiece and frictionally drives it, and the radial support of the workpiece is by fixed or movable means independent of said spindle. In a chucking machine, tool spindle axis 13 is in the plane defined by intersecting axes 15 and 16, whereas in a centerless machine the tool spindle axis 13 may be slightly out of said plane to provide the necessary driving and holding forces, but it is nevertheless contained in a plane parallel to the plane defined by said axes 15 and 16. The drive for said spindle in either case may be by any conventional means such as an electric or hydraulic motor contained in the workhead 12.

In Fig. 7 is shown the toolhead 14 carrying the grinding tool T. The elements of said toolhead are contained in a tubular housing 54 with an internal bore 55 extending therethrough. Extending from housing 54 are two diametrically-spaced trunnions 56 with cylindrical surfaces having a common axis 16, said axis being in the same plane with and intersecting the axis 15 of bore 55 at 90°. By means of said trunnions, the housing 54 is mounted for pivotal movement about axis 16 and for transverse movement relative to the axis 15 of bore 55, in the bearings 20 of the base 10. Said bearings have bores 59 with their axis extending coincidental with axis 16, which axis is thus located in the base 10 in a position to intersect the extension of the rotative axis 13 of the workpiece driving spindle and contained in a plane parallel therewith as well as intersecting tool spindle axis 15. For the purpose of securing a suitably rigid mounting of toolhead 14 which at the same time has as frictionless as possible a movement, there is superimposed between the trunnion surface 57 and bore 59 several rows of balls 58 encircling the trunnions 56, said balls being separated by a retainer as known in the art and further being assembled with a preload. Coaxial with bore 55 is mounted a tubular slide 60 for reciprocatory movement along axis 15, coincidental with the longitudinal axis of the outside cylindrical surface 61. Between said slide surface and bore 55 is assembled rows of balls 62 of the same arrangement and same purpose described above in connection with trunnions 56. The inboard or right end of slide 60 is provided with an annular face 63 perpendicular to the axis of surface 61 and inwardly from said face there is a pilot bore 65 coaxial to said latter axis.

A double-acting hydraulic cylinder 66 with its piston 68 constitute the power means for imparting the reciprocatory movement on slide 60, said cylinder being furnished with pressurized fluid media by suitable control and distribution means well known in the art. A flanged portion 67 of cylinder 66 is mounted at the outboard end of bore 55, and by any suitable means attached to outboard or left end of housing 54. The extension of piston 68 is piloted in a bore of an internal transverse wall 64 of slide 60 and secured thereto by threaded means as indicated. Although the described cylinder and cooperating elements are illustrated in a centralized position in the drawings, this is not absolutely necessary. On the contrary, by offsetting the axis of the cylinder eccentrically in relationship to the axis of the slide 60, a keying action against torsional forces acting on said slide is provided. A wheelhead 70 is mounted in bore 65 and attached to face 63 of slide 60, said wheelhead having mounted therein a rotatable spindle 72 with its axis 15 coaxial with bore 55 and surface 61, the spindle being suitably driven by a high speed electric motor contained in the head 70. On the free end of said spindle to the right as shown in the drawings is mounted a grinding wheel T for the purpose of generating an internal surface of revolution on the workpiece W.

A feed movement, in transverse direction to axis of spindle 72, is imparted to tool T by moving the entire tool or wheelhead system along the longitudinal axis 16 of aforesaid trunnions 56 by automatic or manual means, the latter herein being shown. Thus, the front trunnion has a threaded screw portion 74 cooperating with a rotatable nut 76 journaled in cap 78, which cap is fastened to a face of bearing 20 at the front side of the base by means of screws 79, a hand wheel 80 secured to said nut being provided for actuating the feed movement.

Means are further provided for supporting the outboard end of housing 54 remote from trunnions 56 at the opposite end of base 10 from workhead 12, and thereby restraining any torsional movement about the trunnion axis of the system, while still allowing a friction-free transverse sliding motion of suitable rigidity. Thus, slightly inboard of the left end of housing 54 is a downwardly depending lug 84 having a bore 85, the axis of which is parallel to the axis 16 of trunnions 56. Through said bore passes a shaft having a central cylindrical surface 88 with outside flat portions 90 resting on pads 31 of the base 10, and secured thereto by screws 92. Between the bore 85 and central surface 88 is introduced a ball assembly 86 in the same way and for the same purpose as described above for the trunnion assembly. By shimming between the surfaces of flat portions 90 and pad 31 a simple means is provided for aligning the plane defined by axes 15 and 16 with a plane containing workhead spindle axis 13 by adjustably pivoting the plane defined by axes 15 and 16 about axis 16. The workhead 12 can be furnished with a conventional swivel to allow swiveling of the work spindle axis 13 within a plane parallel to the plane defined by axes 15 and 16. Thus, it is possible to align said axes 13 and 15 into a desired angular relationship as required.

It is noted that an air gap for minimizing thermal transmission is provided for example at 94 at Fig. 8, and the presence of transmission paths for incident thermal energy is clear from the description as a whole.

Thus, I have herein described a novel internal grinding machine with an integral base structure forming in combination with the operative elements of the machine a unitary structure having unique advantages as follows: Rigidity in terms of freedom from deflections between the workpiece and the tool; effective damping means for unavoidable vibrations caused by the reciprocatory and rotating forces, and by the contact between the tool and work; shortest possible force path between tool and work, which when in contact forms a closed loop with the base; all axes of rotatable and reciprocatory movement in one plane; axis of the reciprocating slide coaxial with the tool spindle; and axes symmetrically supported by trunnions journaled directly in the base structure at a node position of the vibrational system.

Having thus described my invention in the embodiment of an internal grinding machine, it will be clear to those skilled in the art that the disclosed invention has a field of utility with many possible variations without departing from its spirit and scope, and it is not my intention to limit myself to the described preferred embodiment except as set forth in the appended claims.

I claim:

1. In a grinding machine having a base and a reciprocal and rotatable work-engaging member, mounting means for said member including a slide supporting said member, a tubular housing for said slide, preloaded bearing means interposed between said housing and said slide, means for reciprocating said slide, trunnion means supporting said housing on said base for pivotal movement about an axis transverse to and coplanar with the axis of said housing, and means for moving said housing transversely along the axis of said trunnion means.

2. A grinding machine as claimed in claim 1 in which said member is a tool and which includes a rotatable work support mounted on said base, the axis of rotation of said work support being parallel with the plane of said other axes.

3. A machine tool as claimed in claim 1 further including a transverse member to rigidify a central portion of said base, said axis of transverse movement being supported by said central portion.

4. A machine tool as claimed in claim 3 wherein said base has a rigid portion connected to said central portion, said workpiece driving spindle being mounted thereon.

5. In a grinding machine having a base, a reciprocal and rotatable tool holding spindle, and a workpiece driving spindle, mounting means for said rotatable tool holding spindle including a slide supporting said tool holding spindle for reciprocatory movement, a tubular housing for said slide, preloaded bearing means interposed between said housing and said slide, means for reciprocating said slide, trunnion means supporting said housing on said base for pivotal movement about an axis transverse to and coplanar with the axis of said housing, and means for moving said housing transversely along the axis of said trunnion means.

6. A grinding machine as claimed in claim 5 further including means remote from said trunnion means axis supporting said housing.

7. A grinding machine as claimed in claim 5 wherein said base structure includes a transverse bulkhead member directly supporting said trunnion means.

8. A grinding machine comprising a base structure, a workpiece driving spindle mounted on said base structure adjacent one end thereof for rotating about an axis a workpiece to be ground, trunnion means mounted on said base structure intermediate the ends thereof and having a transverse axis perpendicular to said workpiece driving spindle axis, a toolhead mounted in said trunnion means for pivotal movement about said trunnion means axis and for transverse movement, said toolhead including a tubular housing, a slide mounted in said housing, and bearing means interposed between said housing and said slide to support said slide, toolhead supporting means remote from said trunnion means axis for supporting said toolhead, means for moving said toolhead along said trunnion means axis, and a grinding tool spindle mounted in said slide for rotation about an axis perpendicular to said trunnion means axis and in a plane therewith, and means for reciprocating said grinding tool spindle along its axis.

9. A grinding machine as claimed in claim 8 wherein said bearing means includes ball slide means having preloaded balls.

10. A grinding machine as claimed in claim 8 wherein said tool head supporting means is adjacent the opposite end of said base from said workpiece driving spindle and includes ball slide means movable in a direction parallel to the axis of said trunnion means and means for adjustably positioning said toolhead about said trunnion means axis.

11. A grinding machine as claimed in claim 8 wherein said base structure comprises a plurality of sheet metal members forming a substantially closed box, and a transverse vertical bulkhead member of high mass directly supporting said trunnion means intermediate the ends of said box providing a node of vibration of said base structure.

12. A grinding machine as claimed in claim 11 wherein said base structure further comprises internal bracing members of sheet metal extending in a vertical plane and connecting said transverse bulkhead to each end of said box.

13. A grinding machine as claimed in claim 12 wherein said internal bracing members extend from adjacent the outer edges of said transverse bulkhead inwardly toward said ends, and include curved end portions in firm pressure contact with said transverse bulkhead and said ends respectively along a relatively narrow area of contact, and areas of weld metal joining said curved ends to said bulkhead and ends respectively and extending therebetween on each side of said area of contact and spaced therefrom to provide a void between said area of contact and said weld metal.

14. A prestressed welded base structure comprising a plurality of sheet metal members forming a generally rectangular box section, a transverse bulkhead member of high mass intermediate the ends of said box section providing a node of vibration of said base structure, an internal bracing member of sheet metal connecting at said transverse bulkhead with one end of said box section, said bracing member having at least one curved portion in firm pressure contact with one of said members along a relatively narrow longitudinally extended area, and areas of weld metal joining said curved portion and said member and extending therebetween on each side of said extended area of contact and spaced therefrom to provide a void between said area of contact and said weld metal, whereby shrinkage forces produced in said bracing member by welding said areas are resisted by the sheet metal members of said box section extending between the ends of said internal bracing member to provide a vibration damping joint between said curved portion and said member.

15. A prestressed welded base structure as claimed in claim 14 wherein internal bracing members extend from said transverse bulkhead to opposite ends of said box section.

16. A prestressed welded base structure as claimed in claim 15 wherein each end of each of said bracing members is curved in firm pressure contact with said transverse bulkhead member and said sheet metal members respectively, and areas of weld metal are provided joining each said curved portion and a respective member and extending therebetween on each side of an extended areas of contact and are spaced therefrom to provide a void between said area of contact and said weld metal.

17. An internal grinding machine comprising a prestressed welded base structure including a plurality of sheet metal members forming a generally rectangular closed box, a workpiece driving spindle mounted on said base structure adjacent one end thereof for rotating about an axis a workpiece to be ground, a toolhead mounted on said base structure intermediate the ends thereof including a grinding tool spindle mounted therein for rotation about an axis, a transverse bulkhead member of high mass directly supporting said toolhead and providing a node of vibration of said base structure, internal bracing members of sheet metal connecting said transverse bulkhead with each end of said closed box, said internal bracing members having curved ends in firm pressure contact with said transverse bulkhead and said box ends respectively along a relatively narrow extended area of contact, areas of weld metal joining said curved ends to said transverse bulkhead and said box ends respectively and extending therebetween on each side of said extended area of contact and spaced therefrom to provide a void between said area of contact and said weld metal, whereby shrinkage forces produced in said bracing members by welding said areas are resisted by the sheet metal members of said box.

18. An internal grinding machine as claimed in claim 17 wherein said base structure includes toolhead supporting bearing means in said base at the upper end of said transverse bulkhead means.

19. An internal grinding machine as claimed in claim 17 wherein said transverse bulkhead includes a pair of spaced transverse vertical plate members of high mass with sheet metal members welded therebetween to form a closed box section.

20. An internal grinding machine comprising a base structure having a machine element supporting side with a reinforced portion generally centrally thereof extending perpendicularly thereto from side to side thereof, a workhead rigidly mounted on said base on said machine element supporting side adjacent one end thereof, said workhead including a workpiece driving spindle for rotating about an axis a workpiece to be ground, a toolhead including a grinding tool spindle for rotating about an axis a grinding tool, trunnion means supporting said toolhead for longitudinal reciprocative movement, said trunnion means being mounted for pivotal and transverse movement adjacent its tool carrying end on the machine element supporting side of said base at said reinforced portion for pivotal movement about a transverse axis perpendicular to and intersecting said tool spindle axis, and adjacent its opposite end on the machine element supporting side of said base for adjustable pivotal movement about said transverse axis to position the plane defined by said transverse and tool spindle axes parallel to a plane containing said workpiece driving spindle axis means to reciprocate said toolhead, and means to produce transverse movement of said trunnion means.

References Cited in the file of this patent

UNITED STATES PATENTS

| | | |
|---|---|---|
| 1,840,741 | Reid | Jan. 12, 1932 |
| 2,343,811 | Shugars | Mar. 7, 1944 |
| 2,373,798 | Williams | Apr. 17, 1945 |
| 2,457,743 | Stevens | Dec. 28, 1948 |
| 2,580,989 | Arms | Jan. 1, 1952 |
| 2,583,363 | Durland | Jan. 22, 1952 |
| 2,683,335 | Strnad | July 13, 1954 |